US009815184B2

(12) United States Patent
Da Rocha

(10) Patent No.: US 9,815,184 B2
(45) Date of Patent: Nov. 14, 2017

(54) DEVICE FOR DETECTING THE PRESENCE OF A REMOVABLE TOOL OF A LINEAR ACTUATOR

(71) Applicant: VIRAX, Epernay (FR)

(72) Inventor: Franck Da Rocha, Puisieulx (FR)

(73) Assignee: VIRAX, Epernay (FR)

( * ) Notice: Subject to any disclaimer, the term of this patent is extended or adjusted under 35 U.S.C. 154(b) by 521 days.

(21) Appl. No.: 14/462,616

(22) Filed: Aug. 19, 2014

(65) Prior Publication Data

US 2015/0053447 A1    Feb. 26, 2015

(30) Foreign Application Priority Data

Aug. 20, 2013   (FR) ...................................... 13 58088

(51) Int. Cl.
| B25B 27/10 | (2006.01) |
| H02K 7/06 | (2006.01) |
| B25D 11/00 | (2006.01) |
| B25B 27/14 | (2006.01) |

(52) U.S. Cl.
CPC ............ *B25D 11/005* (2013.01); *B25B 27/10* (2013.01); *B25B 27/146* (2013.01); *H02K 7/06* (2013.01)

(58) Field of Classification Search
CPC ........ B25D 21/06; B25D 21/10; B25D 21/00; B25D 7/02; B25D 11/005; B25D 27/10; B25D 27/146; H02K 7/06
USPC ............................................ 173/217, 2, 176
See application file for complete search history.

(56) References Cited

U.S. PATENT DOCUMENTS

2011/0005084 A1 *   1/2011   Thorson ................ B23D 21/04
                                              173/217

FOREIGN PATENT DOCUMENTS

| DE | 10 2008 024018 A1 | 11/2008 |
| FR | 2 873 514 A1 | 1/2006 |

OTHER PUBLICATIONS

Preliminary Search Report dated Apr. 24, 2014 in related French Patent Application No. 13 58088.

* cited by examiner

*Primary Examiner* — Michelle Lopez
(74) *Attorney, Agent, or Firm* — Eric L. Lane; Green Patent Law

(57) ABSTRACT

The present disclosure relates to a linear actuator including drive means for driving a movable component assembly for actuating a tool controlled by an electronic module. In exemplary embodiments, the module comprises acquisition means for acquiring a quantity that is representative of the instantaneous force supplied by the drive means and/or the time derivative of this variable, and the electronic module is capable of controlling interruption means for interrupting the operation of the drive means if the variable does not exceed a first predetermined value during a first predetermined time period from the start of the driving of the movable component assembly, and/or if the derivative does not exceed a second predetermined value during the first predetermined time period from the start of the driving of the movable component assembly.

12 Claims, 3 Drawing Sheets

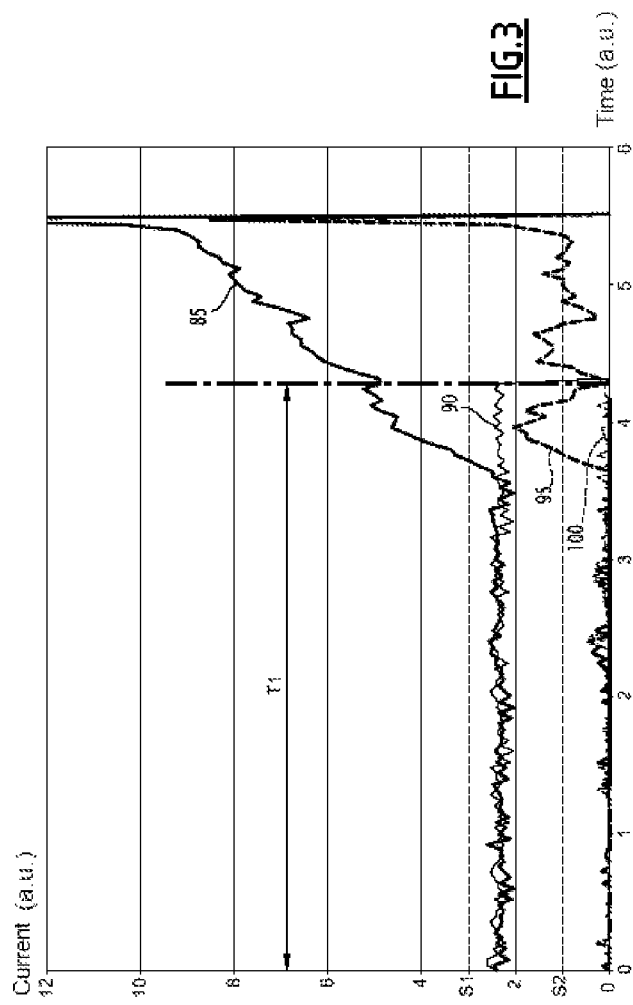

DEVICE FOR DETECTING THE PRESENCE OF A REMOVABLE TOOL OF A LINEAR ACTUATOR

CROSS-REFERENCE TO RELATED APPLICATION

This application claims priority to and benefit of French Patent Application No. 13 58088, filed Aug. 20, 2013.

BACKGROUND AND SUMMARY

The present invention relates to a linear actuator adapted to receive a removable tool and including the drive means for driving a movable component assembly for actuating the tool, controlled by an electronic module.

The invention is applicable to linear actuators, especially electro-mechanical actuators, designed for receiving a removable tool. The tool is actuated by a movable component assembly of the actuator. For example, such a tool is a tube working tool.

It is generally necessary to detect the arrival at the end of travel of the movable component assembly, as this may damage the actuator.

Patent FR-A-2 873 514 describes a linear actuator capable of receiving a removable tool, the tool being actuated by a screw driven in a translational movement, by an electric motor in both directions along its axis, designated by front and rear. This actuator includes sensors, in this case Hall effect sensors, for detecting the passage of a marker integrally attached to the screw, in this case a magnet, and for enabling the stop of the engine upon the screw reaching the end of travel in the front and/or rear directions.

Nevertheless, such an actuator does not give complete satisfaction. Indeed, the presence of the sensors results in additional manufacturing costs and increases the size and weight of the actuator.

An object of the invention is to provide an actuator having a reduced number of sensors.

To this end, the object of the invention relates to an actuator of the aforementioned type, in which the electronic module comprises the acquisition means for acquiring a variable that is representative of the instantaneous force supplied by the drive means and/or the time derivative of this variable, and in which the electronic module is capable of controlling the interruption means for interrupting the operation of the drive means if the said variable does not exceed a first predetermined value during a first predetermined time period from the start of the driving of the movable component assembly, and/or if the said derivative does not exceed a second predetermined value during the first predetermined time period from the start of the driving of the movable component assembly.

Indeed, the interruption of the operation of the drive means at the conclusion of the first predetermined time period prevents the bringing of the movable component assembly to the end stop position when no mechanical stress induced by the presence of a tool is detected.

According to particular embodiments, the invention presents one or more of the following characteristic features, taken into consideration individually or in accordance with any technically feasible combination:

- the electronic module is capable of controlling the interruption means for interrupting the operation of the drive means if the said derivative does not exceed a second predetermined value during the first predetermined time period from the start of the driving of the movable component assembly.
- the said drive means comprise an electric motor, and the said variable is the instantaneous intensity of the power supply current of the motor.
- the electronic module comprises the means for automatically initiating operation of the said drive means at the conclusion of the a second predetermined time period after the interruption of their operation by the said interruption means, in order to bring back the movable component assembly into an initial rest position.
- the actuator is powered by a battery.
- the electronic module comprises the means for modifying the said first predetermined time period based on the level of charge of the battery.

BRIEF DESCRIPTION OF THE DRAWINGS

The invention will be better understood with the help of the description which follows, given purely by way of example and with reference made to the accompanying drawings in which:

FIG. 3 is a graph representing the curves of the current intensity consumed by the actuator shown in FIG. 1 and the time derivative of this intensity.

DETAILED DESCRIPTION

Figure 1:
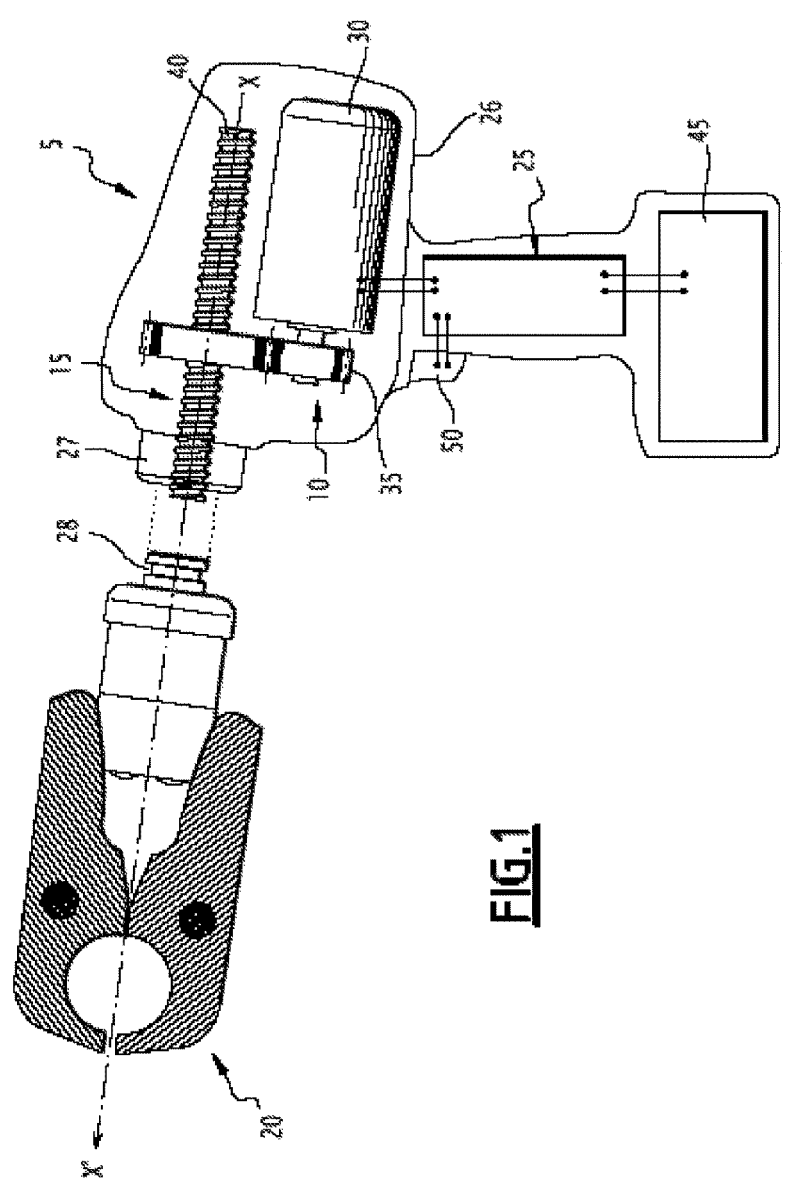
FIG. 1 is a schematic representation of an actuator according to the invention.

As it appears in FIG. 1, a linear actuator 5 comprises the means 10 for driving a movable component assembly 15 along a longitudinal axis X-X' so as to actuate a removable tool 20.

The means 10 are controlled by an electronic module 25. The means 10, the movable component assembly 15 and the electronic module 25 are arranged in a body 26 of the actuator 5.

The actuator 5 comprises the fastening means 27 capable of cooperating with the fastening means 28 of the tool 20 in order for integrally securing the tool 20 to the actuator 5 in a removable manner.

The tool 20 is for example a tube working tool.

For example, the means 10 are formed by an electric motor 30, for example, a direct current motor, and a reduction gear 35.

For example, the movable component assembly 15 is a screw 40 extending along the longitudinal axis X-X'. The screw 40 is driven in translational linear motion along the axis X-X' by the motor 30 by means of the reduction gear 35, between a retracted position, shown in FIG. 1, and an advanced position of the screw 40 outside the body 26 of the actuator 5.

The electronic module 25 controls in particular the electric power supply of the motor 30 supplied by a power source, for example, a battery 45.

The actuator 5 also has a manual switch 50 in order to allow the user to initiate operation of the actuator 5. Preferably, at the time of initiating operation, the screw 40 is in the retracted position.

The manual switch 50 is connected to the electronic module 25.

Figure 2:
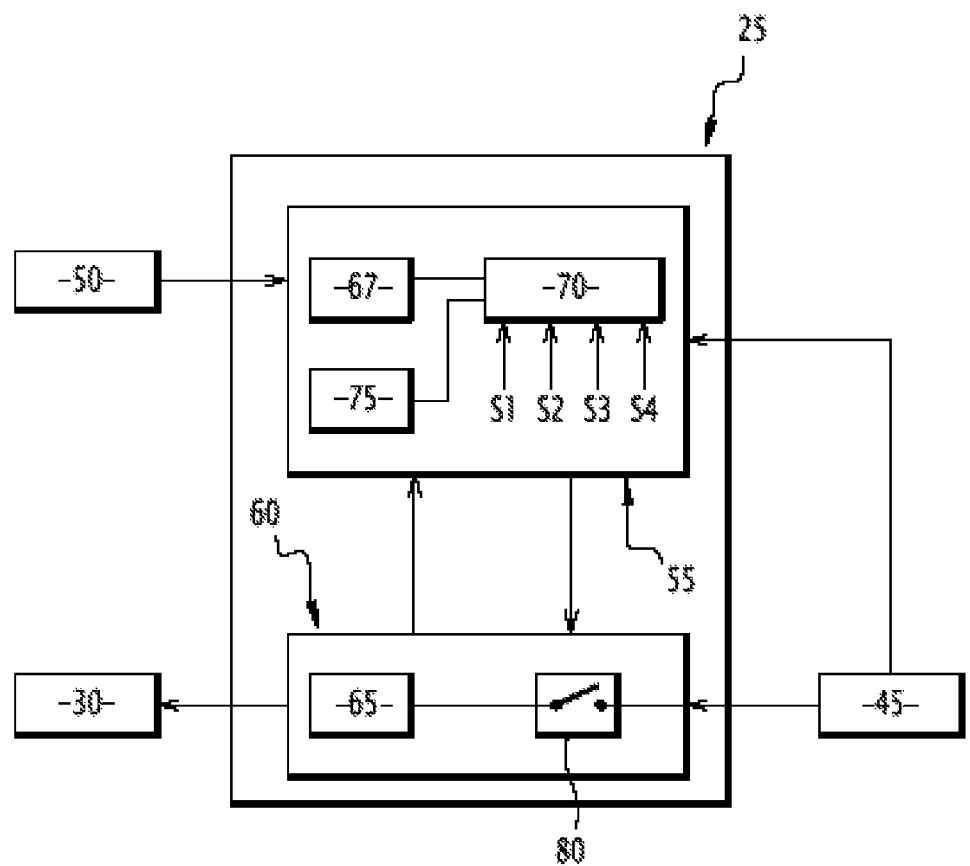
FIG. 2 is a block diagram of the electronic module of the actuator shown in FIG. 1.

As it appears in FIG. 2, the electronic module 25 includes a control module 55 connected to a power supply module 60.

The power supply module 60 ensures the management of power supply to the motor 30 and is interposed between the battery 45 and the motor 30.

The power supply module 60 includes the acquisition means 65 for acquiring the value of the instantaneous intensity of the power supply current of the motor 30.

The switch 50 is connected to the control module 55.

The control module 55 includes the means 67 for calculating the time derivative of the intensity of the power supply current.

The control module 55 also includes a clock 75 for measuring the time elapsed since the setting in operation of the linear actuator by means of the manual switch 50.

The control module 55 in addition comprises the comparison means 70 for comparing the intensity of the power supply current to a first predetermined value S1, and the time derivative of the intensity of the power supply current to a second predetermined value S2, in order to actuate a main cut off switch 80 for cutting off power supply to the motor 30 if the intensity of the power supply current, and the time derivative thereof, respectively do not exceed the first predetermined value S1, and the second predetermined value S2, respectively, at the conclusion of a first predetermined time period T1 since the setting in operation of the actuator 5.

Preferably, the first predetermined time period T1 depends on the level of charge of the battery 45. For example, the first predetermined time period T1 is a decreasing linear function of the charge of the battery 45, to compensate for the decrease in power supplied by the battery 45 during the course of its discharge.

The comparison means 70 are also capable of comparing the intensity of the power supply current to a third predetermined value S3 and the derivative of the intensity of the power supply current to a fourth predetermined value S4, in order to actuate a main cut off switch 80 for cutting off power supply to the motor 30 if the intensity of the power supply current, and the time derivative thereof, respectively, exceed the third predetermined value S3, and the fourth predetermined value S4 respectively.

The operation of actuator 5 will be explained in connection with FIG. 3.

FIG. 3 represents the variation over time of the power current supplied to the motor 30 from the setting in operation of the actuator 5 by the manual switch 50, in the event where the actuator 5 is equipped with the tool 20, curve 85, and in the event where the actuator 5 is not provided with the tool 20, curve 90. In a direct current electric motor, the intensity of the power supply current of the motor and the force supplied by the latter being proportional to each other, the curves 85 and 90 are indeed representative of the force supplied by the motor 30.

FIG. 3 also shows the time derivatives of the currents corresponding to the curves 85 and 90, respectively being the curves 95 and 100.

When the actuator 5 is equipped with the tool 20 and it is set in operation, the screw 40 advances out of the body 26 of the actuator 5 towards the tool 20. The screw 40 comes into contact with a portion of the tool 20. The motor 30 supplies an additional force in order to actuate the tool 20, which results in an increase of the power current supplied to the motor 30 and a variation of its time derivative, as it appears over the curves 85 and 90 respectively, from 3.6 units of time.

For example, when the intensity of the power supply current of the motor 30, or the value of the derivative thereof, exceeds the third predetermined value S3, and respectively, the fourth predetermined value S4, the comparison means 70 actuate the main switch 80.

When the actuator 5 is not provided with the tool 20 and it is set in operation, in the same manner as previously noted above, the screw 40 advances out of the body 26 of the actuator 5, from X to X'. The tool 20 being absent, the motor 30 supplies a substantially constant force over time so as to cause the advancing of the screw 40, as it appears over the curve 90 in which the supply current of the motor 30 is substantially constant and less than the first predetermined value S1 in the interval comprised between 0 unit of time and 4.3 units of time. The derivative of the intensity of the power supply current is substantially zero, and therefore less than the second predetermined value S2, over the course of this interval, as is shown by the curve 100.

At the conclusion of the first predetermined time period T1, for example 4.3 units of time in FIG. 3, the main switch 80 is actuated and the power supply to the motor 30 is interrupted. Indeed, during the first predetermined time period T1, the power supply current has remained below the first predetermined value S1 and the time derivative of this current has remained below the second predetermined value S2.

Advantageously, at the conclusion of a second predetermined time period T2 after the actuation of the main switch 80, the motor 30 is automatically started up in order to bring back the screw 40 into its retracted position as illustrated in FIG. 1.

For example, the second predetermined time period T2 is comprised between 0 s and 2 s.

By way of a variant, the main switch 80 is actuated if, during the first predetermined time period T1, the time derivative of the power supply current of the motor 30 has remained below the second predetermined value S2, regardless of the value of this current.

According to another embodiment (not shown) of an actuator according to the invention, the drive means 10 comprises hydraulic means, for example a cylinder. The electronic module 25 comprises for example the means for acquiring a variable value dependent upon the instantaneous force supplied by the cylinder, for example of the fluid pressure supply of the cylinder.

The invention claimed is:

1. A linear actuator adapted to receive a removable tool, and including drive means for driving a movable component assembly for actuating the tool, controlled by an electronic module,
    wherein the electronic module comprises acquisition means acquiring a variable that is representative of an instantaneous force supplied by the drive means or a time derivative of this variable, or both the variable and the time derivative, and
    wherein the electronic module controls interruption means for interrupting the operation of the drive means if the variable does not exceed a first predetermined value during a first predetermined time period from the start of the driving of the movable component assembly, or
    if the time derivative does not exceed a second predetermined value during the first predetermined time period from the start of the driving of the movable component assembly, or
    if the variable does not exceed a first predetermined value during a first predetermined time period from the start of the driving of the movable component assembly and the time derivative does not exceed a second predetermined value during the first predetermined time period from the start of the driving of the movable component assembly.

2. An actuator according to claim 1, wherein the electronic module is capable of controlling the interruption means for interrupting the operation of the drive means if the time derivative does not exceed a second predetermined value during the first predetermined time period from the start of the driving of the movable component assembly.

3. An actuator according to claim 1, wherein the drive means comprise an electric motor, and the variable is the instantaneous intensity of the power supply current of the motor.

4. An actuator according to claim 1, wherein the electronic module comprises means for automatically initiating operation of the drive means at the conclusion of a second predetermined time period after the interruption of their operation by the interruption means, in order to bring back the movable component assembly into an initial rest position.

5. An actuator according to claim 1, wherein it is powered by a battery.

6. An actuator according to claim 5, wherein the electronic module comprises means for modifying the first predetermined time period based on the level of charge of the battery.

7. A process comprising the following steps:
obtaining a linear actuator adapted to receive a removable tool, and including drive means for driving a movable component assembly for actuating the tool, controlled by an electronic module,
using acquisition means of the electronic module for acquiring a variable that is representative of an instantaneous force supplied by the drive means, or a time derivative of this variable, or both the variable and the time derivative, and
controlling interruption means using the electronic module for interrupting the operation of the drive means, wherein interrupting is performed if the variable does not exceed a first predetermined value during a first predetermined time period from the start of the driving of the movable component assembly, or if the time derivative does not exceed a second predetermined value during the first predetermined time period from the start of the driving of the movable component assembly, or if the variable does not exceed a first predetermined value during a first predetermined time period from the start of the driving of the movable component assembly and the time derivative does not exceed a second predetermined value during the first predetermined time period from the start of the driving of the movable component assembly.

8. The process according to claim 7, wherein the electronic module controls the interruption means for interrupting the operation of the drive means if the time derivative does not exceed a second predetermined value during the first predetermined time period from the start of the driving of the movable component assembly.

9. The process according to claim 7, wherein the drive means comprise an electric motor, and the variable is the instantaneous intensity of the power supply current of the motor.

10. The process according to claim 7, wherein the electronic module comprises means for automatically initiating operation of the drive means at the conclusion of a second predetermined time period after the interruption of their operation by the interruption means, in order to bring back the movable component assembly into an initial rest position.

11. The process according to claim 7, wherein the linear actuator is powered by a battery.

12. The process according to claim 11, wherein the electronic module comprises means for modifying the first predetermined time period based on the level of charge of the battery.

* * * * *